United States Patent
Linder et al.

(10) Patent No.: US 10,102,527 B2
(45) Date of Patent: *Oct. 16, 2018

(54) PROCESS AND SYSTEM FOR DATA TRANSMISSION

(71) Applicant: Swisscom AG, Bern (CH)

(72) Inventors: Jan Linder, Bern (CH); Marc Danzeisen, Ittigen (CH); Simon Winiker, Bern (CH); Florian Baumgartner, Bern (CH)

(73) Assignee: SWISSCOM AG, Bern (CH)

( * ) Notice: Subject to any disclaimer, the term of this patent is extended or adjusted under 35 U.S.C. 154(b) by 565 days.

This patent is subject to a terminal disclaimer.

(21) Appl. No.: 13/965,890

(22) Filed: Aug. 13, 2013

(65) Prior Publication Data

US 2013/0332734 A1 Dec. 12, 2013

Related U.S. Application Data

(63) Continuation of application No. 11/774,674, filed on Jul. 9, 2007, now Pat. No. 8,527,420.

(30) Foreign Application Priority Data

Jul. 7, 2006 (EP) .................................... 06116828

(51) Int. Cl.
*G06F 9/00* (2006.01)
*G06Q 20/38* (2012.01)
*G06F 21/10* (2013.01)
*H04L 29/06* (2006.01)

(52) U.S. Cl.
CPC ......... *G06Q 20/3829* (2013.01); *G06F 21/10* (2013.01); *H04L 63/0428* (2013.01); *H04L 63/062* (2013.01); *H04L 63/08* (2013.01)

(58) Field of Classification Search
USPC .......................................................... 705/50
See application file for complete search history.

(56) References Cited

U.S. PATENT DOCUMENTS

| | | | | |
|---|---|---|---|---|
| 5,999,622 A * | 12/1999 | Yasukawa | ............... | G06F 21/80 380/277 |
| 6,157,723 A * | 12/2000 | Schultz | ................... | H04L 9/088 380/249 |
| 6,157,941 A * | 12/2000 | Verkler | ............... | H04W 88/182 709/202 |
| 6,226,618 B1 * | 5/2001 | Downs | .................... | G06F 21/10 380/279 |

(Continued)

FOREIGN PATENT DOCUMENTS

EP 1372055 12/2003
EP 1480100 11/2004

*Primary Examiner* — Zeshan Qayyum
(74) *Attorney, Agent, or Firm* — McAndrews, Held & Malloy, Ltd.

(57) ABSTRACT

In a method and a system for data transmission, authentication data and an electronic key may be generated, with the electronic key being stored as assigned to the authentication data. Data may be encrypted, such as by a central communications device, into encrypted data, using at least part of the electronic key. Based on reception of the authentication data from a communications terminal, at least a portion of the electronic key and the encrypted data may be transmitted from the central communications device to the communications terminal.

18 Claims, 3 Drawing Sheets

(56) References Cited

U.S. PATENT DOCUMENTS

| | | | |
|---|---|---|---|
| 6,263,313 B1 * | 7/2001 | Milsted | G06F 21/10 341/51 |
| 7,245,908 B1 | 7/2007 | Weaver et al. | |
| 8,484,268 B2 | 7/2013 | Danzeisen et al. | |
| 2002/0013772 A1 | 1/2002 | Peinado | |
| 2002/0018580 A1 * | 2/2002 | Maeda | H04N 21/234318 382/100 |
| 2002/0085719 A1 | 7/2002 | Crosbie | |
| 2002/0133595 A1 | 9/2002 | Kimura et al. | |
| 2003/0108205 A1 * | 6/2003 | Joyner | H04L 9/0618 380/277 |
| 2004/0022391 A1 | 2/2004 | O'Brien | |
| 2004/0176974 A1 | 9/2004 | Twig et al. | |
| 2005/0021539 A1 * | 1/2005 | Short | H03M 7/40 |
| 2008/0010216 A1 | 1/2008 | Danzeisen et al. | |

\* cited by examiner

PROCESS AND SYSTEM FOR DATA TRANSMISSION

CROSS-REFERENCE TO RELATED APPLICATIONS

This application is a continuation of U.S. patent application Ser. No. 11/774,674 that was filed on Jul. 9, 2007, which in turn was based on and claims priority from European (EP) Patent Application No. 06116828.2 filed on Jul. 7, 2006. Each of the aforementioned applications is hereby incorporated herein by reference in its entirety.

BACKGROUND OF THE INVENTION

Field of the Invention

The present invention relates to a process and a system for data transmission.

Description of the Related Art

In the state of the art, a transmission of data between terminals and/or servers takes place in accordance with various processes. Such processes are often particularly adapted in order to transmit messages such as, for example, E-mail messages or current headlines, or in order to transmit multimedia data such as an audio or video file. In order to transmit data from a server to a terminal of a user, for example, it may be necessary first to check the entitlement of the user to access certain data. Such a check on entitlement may be made, for example, by a request for a user name and a password. Since a transmission of data often takes place over public networks, it is advantageous to carry out this transmission of data by means of a secured data connection, such as by means of a VPN connection (VPN: virtual private network). The transmission of data between a server and a terminal can thus be subdivided into a phase for the check on entitlement, or authentication phase, and a phase for the transfer of data. Because of the user interaction, the authentication phase often takes a relatively long time, though only little network bandwidth is required. The data transfer phase may on the other hand last only for a short while, depending on the volume of data, and use all of the available network bandwidth.

E-mail messages to a user are, for example, stored on an E-mail server. The user retrieves the E-mail messages stored on the E-mail server by means of an E-mail client. In the state of the art, protocols such as POP (POP: Post Office protocol) or IMAP (IMAP: Internet E-mail access protocol) are used for this purpose. By means of the E-mail client and such protocols, a connection is made between the E-mail client and the E-mail server, whereupon the E-mail client checks the E-mail server for available E-mail messages and, if necessary, downloads new E-mail messages to the E-mail client. The E-mail client is, of course, checked by authentication for its entitlement to access the E-mail messages. The authentication often takes much longer than the subsequent checking and downloading of the E-mail messages. The checking of E-mail messages can also be based on a VPN tunnel. In this case, however, a VPN tunnel is set up even if no new messages are available on the E-mail server. This leads to inefficiency, since a VPN tunnel is set up even if no data is ready for transmission.

In the state of the art, such a two-phase transmission of data suffers from many disadvantages, particularly for users of mobile terminals. It is admittedly the case that powerful WLAN or UWB networks (WLAN: wireless local area network; UWB: ultra wide band) are available to the user at railway stations, for example. But a user at a railway station often has no time to be authenticated for access to data and to download data to the mobile terminal. After the user has taken a seat on the train, however, the user often has enough time to be authenticated for access to data. At this time, however, the train has often already left the site of the station and frequently at this time the user only has much less powerful networks available, such as a GSM or UMTS network (GSM: global system for mobile communications; UMTS: universal mobile telecommunications system). Thus, the user cannot access large quantities of data at this time, such as an E-mail message with a video file as an attachment, since the transmission capacity of such a less powerful network would be inadequate. Thus, in summary, the authentication followed by data transmission used in the state of the art is, for one thing, inconvenient for the user, since the latter must undertake a user interaction. For another, this kind of user interaction prevents optimization of the capacity utilization of a network infrastructure.

A digital rights management architecture is disclosed in the document EP 1 372 055. A packager prepares data for a user and a licensor provides a license to the user. The packager and the licensor share a secret key and can calculate a content key for the prepared data. The prepared and encrypted data, as well as the content key, are transmitted to the user.

SUMMARY OF THE INVENTION

The present inventions include a new process and a new system for data transmission which overcome the disadvantages of the prior art.

According to an embodiment of the present invention, these objectives are achieved in particular by the elements of the independent claims. In addition, further advantageous embodiments emerge from the dependent claims and the description.

These objectives are achieved by the inventions in particular by the fact that authentication data and an electronic key are generated, whereby the electronic key is stored as assigned to the authentication data, that by means of an authentication module of a central module at least part of the electronic key is transmitted to a communications terminal, that by means of an encryption module and by means of at least part of the electronic key data are encrypted into encrypted data, that the encrypted data are transmitted between the central module and the communications terminal, and that by means of a decryption module of the communications terminal and by means of at least part of the electronic key the encrypted data are decrypted. Such a process has the particular advantage that the transmission of the authentication data or electronic key and the transmission of the encrypted data can take place completely asynchronously. Thus, for example, E-mail messages can be created on the communications terminal and be encrypted with the electronic key. At any time, for example as soon as the communications terminal is situated within the range of a wireless communications network, the encrypted data can be securely transmitted over the wireless communications network, be decrypted by the central module and be passed on to an E-mail server. Encrypted data can of course be transmitted both from the central module to the communications terminal and from the communications terminal to the central module.

In one embodiment of the present invention, data are encrypted into encrypted data by the central module, and the encrypted data are transmitted from the central module to the communications terminal. Such a process has the particular advantage that the authentication for access to data and the actual transmission of data to a communications terminal can take place at different points in time. Thus, the transmission of encrypted data can take place at a time when the user is situated in the vicinity of a powerful network, and the authentication for access to the electronic key and thus to the data can take place at a time when the user has enough time to carry out authentication.

In another embodiment of the present invention, data are encrypted by the communications terminal, and the encrypted data are transmitted from the communications terminal to a further communications device. Such a process has the particular advantage that, for example, data can be prepared for transmission on a mobile communications terminal, in that the data are encrypted into encrypted data. As soon as the mobile communications terminal is situated within the range of a powerful network, the encrypted data can be transmitted to a further communications device. Thus, the user can, for example, process a video file on the train, request a code for encrypting the video file while on the train, and encrypt the video file into an encrypted video file. As soon as the user's mobile communications terminal comes into the range of a powerful wireless network, when the user gets off the train at the railway station, the encrypted video file can be transmitted to a further communications device, to a file server, for example.

In one embodiment of the present invention, a user profile is stored in the central module or on the communications terminal, data being selected and encrypted in accordance with the user profile and transmitted to the communications terminal or to a further communications device. Such a process has the particular advantage that a user can enter into a user profile what data are to be encrypted and transmitted to the communications terminal or to the further communications device. So, for example, it can be entered into a user profile that all E-mail messages of a user are each encrypted and transmitted to the communications terminal of the user at a defined time, for example, in the morning around the time when the user is at the railway station in order to board a train.

In accordance with the inventions, the availability of the communications terminal or of a further communications device is checked by means of an availability module of the central module or of the communications terminal and, if the communications terminal or the further communications device is available, the encrypted data are transmitted to the communications terminal or to the further communications device. Such a process has the particular advantage that the encrypted data can be transmitted to the communications terminal or to the further communications device at the earliest possible time.

In a further embodiment of the present invention, a network interface of the communications terminal is activated by means of an activation module of the central module, and the encrypted data are transmitted to the communications terminal over the activated network interface. Thus, for example, a first network interface of the communications terminal, such as a GSM network interface, can be permanently switched on and a second network interface of the communications terminal, such as a WLAN network interface, can be activated over this first network interface. Such a process has the particular advantage that network interfaces are only switched on by the central module if encrypted data are ready for transmission, whereby in particular the power consumption on the communications terminal can be minimized.

In another embodiment of the present invention, the encrypted data are transmitted to a network device of a network infrastructure, whereby the encrypted data are stored on the network device, and are transmitted asynchronously from the network device to the communications terminal. The network device mentioned can, for example, refer to a network device of a WLAN hot spot, whereby the encrypted data are transmitted to the network device at a first time, for example, in the early morning at a time of low network load, and are transmitted by this network device to the communications terminal of the user at a second time, for example, at a time when the user is waiting for a train at the railway station. Such a process has the particular advantage that the capacity utilization of a network infrastructure can be optimized. Before the encryption of the data, the data can of course be matched to a communications terminal. If, for example, the communications terminal of the user is a mobile computer with an XGA screen resolution of 1024× 768 pixels, it makes no sense to encrypt directly a video file with very high resolution. It is much more sensible in this case first to match the video file by transformation of its resolution to the screen resolution of the user and only then to carry out an encryption of the video file. Such a transformation of the data can in particular be carried out if, for example, appropriate information is stored in a user profile.

In another embodiment of the present invention, a user account is debited with a monetary value upon the transfer of at least part of the electronic key. Such a process has the particular advantage that chargeable services, such as the provision of audio or video files, can be offered to the user by means of the transmission of encrypted data. The service, of course, is only considered to have been provided if both the encrypted data and the associated key have been transmitted to the communications terminal of the user.

In a further embodiment of the present invention, the encrypted data include program code that must be executed in order to decrypt the encrypted data, while validation criteria are checked during the execution of the program code. Thus, the program code can, for example, be of such form that the validity of the key is checked with reference to a time measurement on a central server with which the validity of codes is monitored, or in accordance with any other process. Such a process has the particular advantage that, for example, a time can be defined after which the encrypted data are no longer available. Such a process moreover guarantees compatibility with processes known from DRM (DRM: digital rights management).

In another embodiment of the present invention, an identification is assigned to the data and/or to the encrypted data, and the authentication data are stored as assigned to the identification. Such an identification can, for example, be formed as the result of a hash function on the encrypted data. Such a process has the particular advantage that authentication for access to the encrypted data can also be of different forms with reference to the encrypted data.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
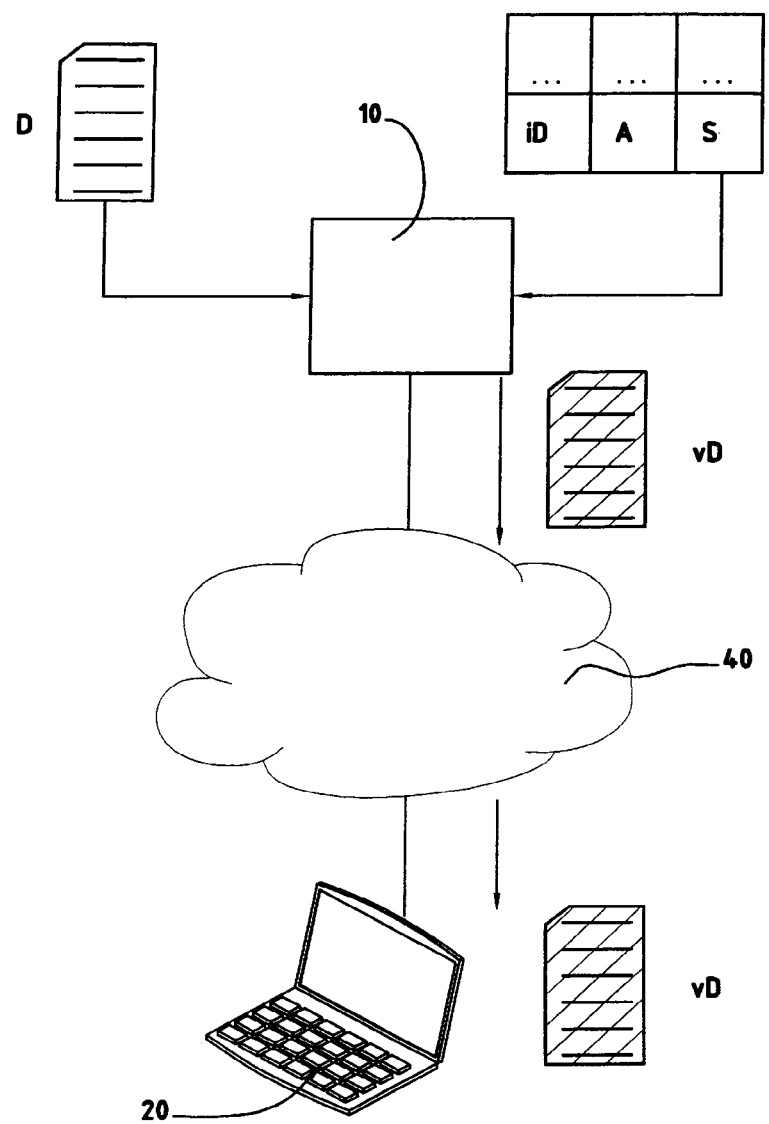
FIG. 1 shows a block diagram with the individual components for the encryption of data and for the transfer of the encrypted data.

Referring now to the drawings, wherein like reference numerals designate identical or corresponding parts throughout the several views.

In FIG. 1, the reference mark 10 refers to a central module. The central module 10 can, for example, be formed as a software module of a network server. The central module 10 can also, of course, be formed completely as a hardware module with appropriate electronic circuits. In FIG. 1, the reference mark D refers to electronic data. The data D can be electronic data of any kind, for example E-mail messages, texts, animations, audio files, video files, or electronic data of any other kind. In FIG. 1, the reference mark A refers to authentication data and the reference mark S refers to an electronic key. The authentication data A can, for example, include a user name and a password or pass phrase. The electronic key S can, for example, consist of a symmetrical electronic key with a secret key or an asymmetrical electronic key with a public key and a private key. The authentication data A are stored as assigned to the electronic key S while, for example, with the central module 10 including a corresponding table. In FIG. 1, the reference mark 40 refers to a communications network. The communications network can, for example, refer to the Internet and can be constructed from various networks of differing technologies. Thus, the communications network can include GSM networks, UMTS networks, WLAN networks, Ethernet networks, UWB networks, or networks of any other kind. As shown in FIG. 1, the central module 10 can in particular be connected to the communications network 40. Data D can be encrypted by means of the electronic key S and an encryption module of the central module 10. Such encryption can refer to any encryption algorithm, for example a DES algorithm (DES: data encryption standard), a PGP algorithm (PGP: pretty good privacy), an IDEA algorithm (IDEA: international data encryption standard), or any other encryption algorithm. Encrypted data vD are generated by the encryption of the data D. The authentication data A and the electronic key S can moreover be stored as assigned to an identification iD of the data, so that the authentication data A and the electronic key S are valid only with reference to data that can be identified by the identification iD of the data. Corresponding tables can of course also be provided for in the central module 10 with reference to the identification iD of the data.

In FIG. 1, reference mark 20 refers to a communications terminal. The communications terminal 20 can be any terminal of a user, for example a mobile computer such as a notebook or a PDA (PDA: personal digital assistant), a mobile telephone, a games console, a permanently installed computer, or any other communications terminal. As shown in FIG. 1, the communications terminal 20 can be connected to the communications network 40. Such a connection can refer to a wireless connection, such as a WLAN connection, a GSM connection, or any other wireless connection, or to a wire-based connection, such as a twisted-pair Ethernet connection, or any other wire-based connection.

The encrypted data vD can thus be transmitted over the communications network 40 to the communications terminal 20 and be stored there. There is the widest variety of options in order thus to store data D as encrypted data vD on the communications terminal 20. E-mail messages, texts, animations, audio files, video files or data of any other kind can be stored on the communications terminal 20 as encrypted E-mail messages, encrypted texts, encrypted animations, encrypted audio files, or encrypted video files. It is, however, the case that the encrypted data vD may still be useless, since for the time being the key to decrypt the encrypted data is stored only on the central module 10.

The transmission of the encrypted data vD to the communications terminal 20 can take place at any convenient time. A convenient time can refer to the arrival of new E-mail messages, the availability of texts, or the publication of a new audio file. A convenient time, however, can also refer to the availability of a communications link between the communications network 40 and the communications terminal 20, the capacity utilization of the communications network 40, the capacity utilization of parts of the communications network 40, a time that occurs due to an input from the user on one of the communications terminals, or any other time.

The transmission of the encrypted data vD can also take place in accordance with various scenarios. One scenario can be that the encrypted data vD are transmitted to the communications terminal 20 at any time during the night over a broadband communications link, such as an Ethernet connection. Such a scenario may be selected, for example, in order to transmit a very large encrypted video file, of an order of magnitude of 5 Gbyte, for example, to the communications terminal 20. Or, in another scenario, encrypted data may be transmitted to the communications terminal 20 as soon as the user carrying this communications terminal 20 comes into the range of a wireless communications network, such as a WLAN network or UWB network at a railway station or on the site of an airport. Such a scenario may be selected, for example, in order to transmit encrypted E-mail messages or encrypted texts to the communications terminal 20 of a user before he boards a train. It may be remarked here that encrypted texts may refer for example to the current electronic issue of a daily newspaper.

Figure 2:
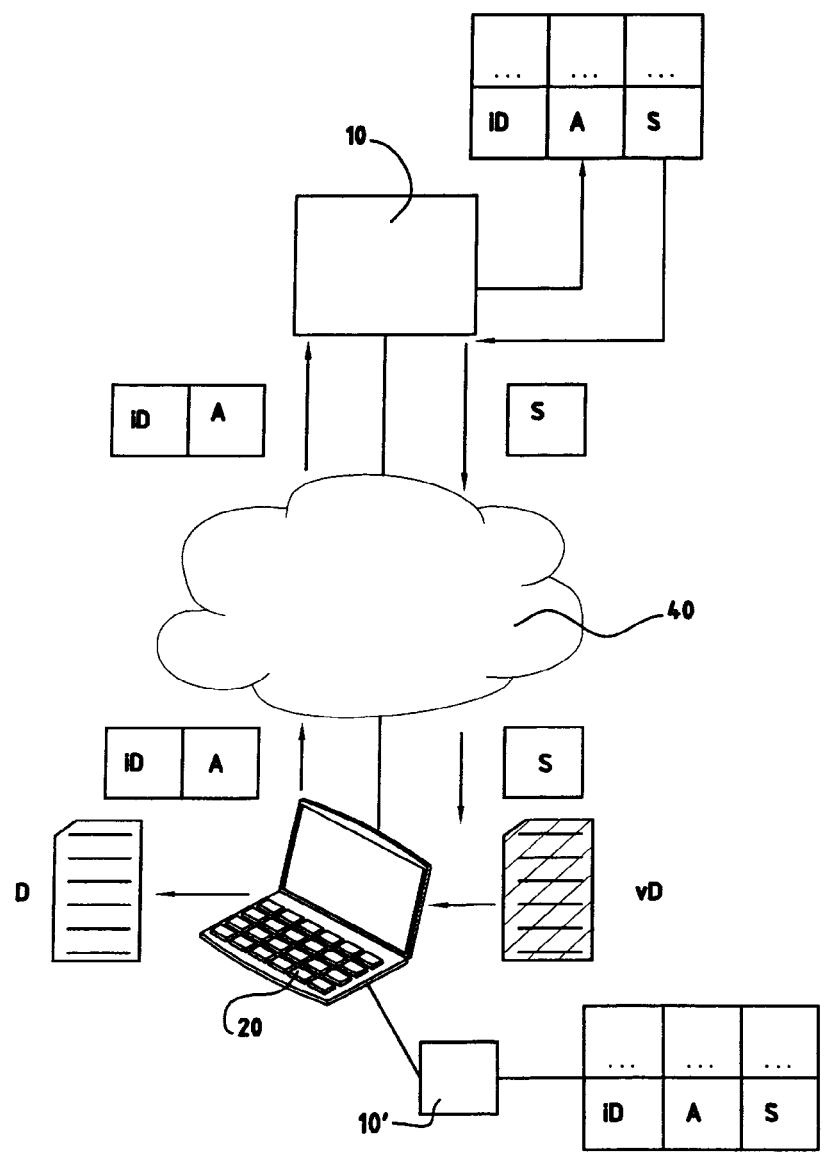
FIG. 2 shows a block diagram with the individual components for the authentication and decryption of the encrypted data.

In FIG. 2, the reference marks introduced in FIG. 1 are retained. As shown in FIG. 2, authentication data A are transmitted from the communications terminal 20 to the central module 10. Entitlement is thus authenticated with the electronic key S. At least parts of the electronic key S are then transmitted from the central module 10 to the communications terminal 20. By means of the electronic key S, the encrypted data vD stored on the communications terminal can be decrypted and stored as data D on the communications terminal, so that the user can access these data D.

An authentication of entitlement with the electronic key S can take place in accordance with known processes. Such processes can take place on the basis of a password or pass phrases, by means of a SecureID card (SecureID: authentication process of the firm RSA Security), on the basis of the acquisition of biometric characteristics, or on any other basis that provides proof of entitlement.

Figure 3:
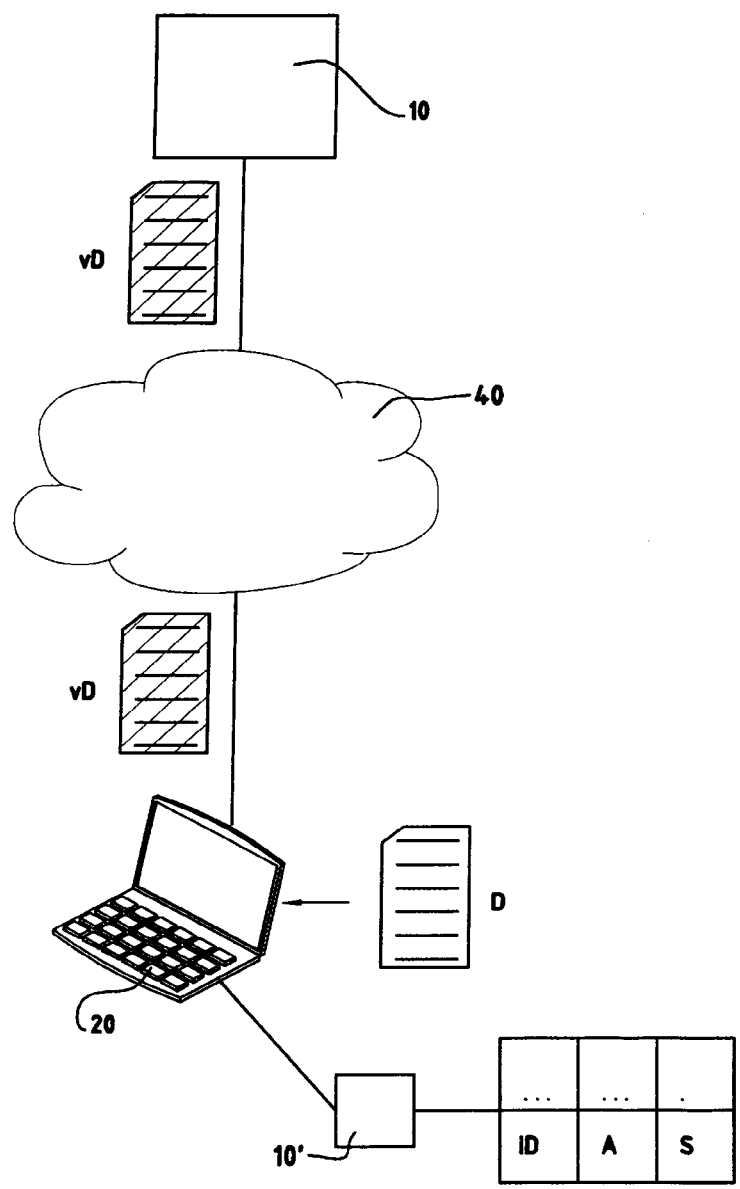
FIG. 3 shows a block diagram with the individual components for the encryption and sending of encrypted data.

As indicated by the dotted areas in FIGS. 1 to 3, the identification iD, the authentication data A, and the key S can be stored in a table containing tuples of such data. A particular tuple may be provided with an identification iD, with authentication data A, and with a key S for a defined purpose. Thus, a first tuple may include an identification iD that refers to video data. A second tuple may include an identification iD that refers to audio data. Thus, video data and audio data, for example, can be encrypted with different keys, with a key for video data, for example, that causes particularly high efficiency in the encryption of the video data and with a key for audio data, for example, that causes particularly high security.

In FIG. 2, the reference mark 10' refers to a local copy of the central module 10 placed on the communications terminal 20. The local copy 10' of the central module 10 may include the same functions as the central module 10. Thus, local copies of the tuples with an identification iD, with authentication data A, and with a key S, can also be stored on the communications terminal 20. The local copy 10' of the central module and the local copies of the tuples mentioned can be protected, for example, by the use of a secret key, such as a PIN (PIN: personal identification number). Thus, it can be provided for that access to the local copy of these functions and data is only enabled for a user who knows the secret key. For example, the functions and data of this local copy can of course track incrementally the corresponding functions and data of the central module 10, or only specific functions and data may be stored in the local copy.

As shown in FIG. 3, data D can be encrypted into encrypted data vD on the communications terminal 20 and be transmitted to a further communications device. Thus, a local copy 10' of the central module 10 with functionality for the encryption of data and with a corresponding key S can be stored on the communications terminal 20. The user of the communications terminal 20 may, for example, record a new video file. As soon as the video file has been completed, the video file can be encrypted into an encrypted video file by means of the functions provided by the local copy 10' of the central module 10. Of course the user can also, by making an appropriate request, obtain a key S from the central module 10 for encrypting the video file. The video file can be encrypted into an encrypted video file and the encrypted video file can be stored on the communications terminal 20. As soon as the communications terminal 20 comes within the range of a powerful network, a WLAN network, for example, the encrypted video file can be transmitted to a further communications device. The further communications device can refer, for example, to the central module 10, a file server, a communications terminal of another user, or any other further communications device.

The previously described process may be encoded in software on a computer readable medium including a compact disk, memory device, flash memory or any other computer readable physical medium. The software is configured to cause a processor-based device to carry out one or more of the steps described above. Computer operations are described in "How Computers Work, Millennium Edition," by Ron White, Que Publications, 1999, the entire contents of which being incorporated herein by reference.

Obviously, numerous modifications and variations of the present invention are possible in light of the above teachings. It is therefore to be understood that within the scope of the appended claims, the invention may be practiced otherwise than as specifically described herein.

What is claimed is:

1. A method comprising:
   encrypting, by a server computer and based on a user defined time, data with an electronic key associated with a type of data;
   determining, by the server computer, accessibility of a communications terminal associated with a user profile;
   activating, by the server computer, a network interface of the communications terminal based on the determining;
   transmitting by the server computer the encrypted data to the communications terminal, over the activated interface;
   receiving, by the server computer, an authentication data from the communications terminal; and
   based on the received authentication data, transmitting by the server computer at least a portion of the electronic key to the communications terminal.

2. The method of claim 1, comprising transmitting the encrypted data asynchronously to communications terminal.

3. The method of claim 1, comprising debiting a user account based on the transfer of the at least part of the electronic key.

4. The method of claim 1, comprising storing the user profile in the server computer.

5. The method of claim 1, wherein the user profile comprises data relating to a screen resolution of the communications terminal.

6. The method of claim 1, wherein the type of data comprises one or more of: email, text message, video data, and audio data.

7. The method of claim 1, wherein the authentication data comprises a user name and a password.

8. The method of claim 1, wherein the type of data, the authentication data, and the electronic key are stored in a table.

9. The method of claim 1, wherein:
   the encrypted data comprises video data and audio data; and
   the video data and the audio data are encrypted with different electronic keys.

10. A system, comprising:
    a server that comprises at least one processor and a memory containing executable instructions that when executed by the at least one processor cause the server computer to:
    encrypt, based on a user defined time, data with an electronic key associated with a type of data;
    determine accessibility of a communications terminal device, wherein the communications terminal device is associated with a user profile;
    activate a network interface of the communications terminal based on the determination;
    transmit the encrypted data to the communications terminal over the activated interface;
    receive an authenticated data from the communications terminal device; and
    transmit at least a portion of the electronic key associated with the type of data to the communications terminal device; based on the received authentication data.

11. The system of claim 10, wherein the server computer is operable to transmit the encrypted data asynchronously to communications terminal.

12. The system of claim 10, wherein the server computer is operable to debit a user account based on the transfer of the at least part of the electronic key.

13. The system of claim 10, wherein the server computer is operable to store the user profile.

14. The system of claim 10, wherein the user profile stores a screen resolution of the communications terminal device.

15. The system of claim 10, wherein the type of data comprises one or more of: email, text message, video data, and audio data.

16. The system of claim 10, wherein the authentication data comprises a user name and a password.

17. The system of claim 10, wherein the type of data, the authentication data, and the electronic key are stored in a table.

18. The system of claim 10, wherein:
the encrypted data comprises video data and audio data; and
the server computer is operable to encrypt the video data and the audio data with different electronic keys.

* * * * *